Figure 1:
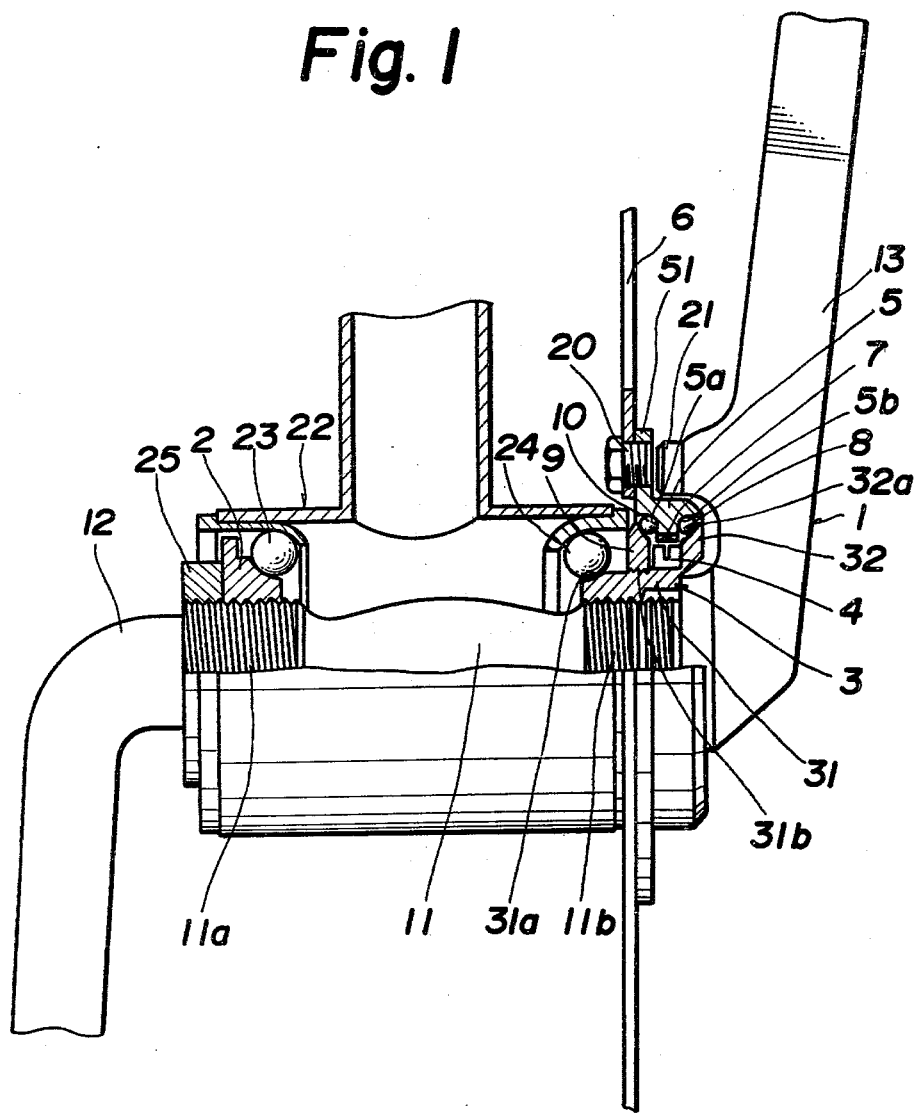

United States Patent [19]

Segawa

[11] 4,183,262
[45] Jan. 15, 1980

[54] GEAR CRANK FOR A BICYCLE

[75] Inventor: Takashi Segawa, Sakai, Japan

[73] Assignee: Shimano Industrial Company Limited, Osaka, Japan

[21] Appl. No.: 706,373

[22] Filed: Jul. 19, 1976

[30] Foreign Application Priority Data

Aug. 1, 1975 [JP] Japan .................. 50-107782[U]
Nov. 21, 1975 [JP] Japan .................. 50-159204[U]
Nov. 21, 1975 [JP] Japan .................. 50-159205[U]

[51] Int. Cl.² ................... B62M 3/00; F16D 23/00
[52] U.S. Cl. ................................ 74/594.2; 192/64; 280/261
[58] Field of Search .......... 74/750 B, 217 B, 594.1, 74/594.2; 192/48.92, 64, 5; 280/236, 237

[56] References Cited

U.S. PATENT DOCUMENTS

| 506,105 | 10/1893 | Donnelly | 74/594.2 |
|---|---|---|---|
| 624,635 | 5/1899 | Fauber | 74/594.2 |
| 643,349 | 2/1900 | Fauber | 74/594.2 |
| 2,211,548 | 8/1940 | Schwinn | 192/64 |
| 2,257,401 | 9/1941 | Schwinn | 308/179.5 |
| 3,377,883 | 4/1968 | Thun | 74/594.2 |
| 3,433,097 | 3/1969 | Fox | 74/750 B |
| 3,492,883 | 2/1970 | Maeda | 74/217 B |
| 3,608,184 | 9/1971 | Thun | 74/594.1 |
| 3,835,729 | 11/1972 | Tarutani | 74/594.2 |

FOREIGN PATENT DOCUMENTS

| 413094 | 1/1936 | Belgium | 74/594.2 |
|---|---|---|---|
| 423497 | 10/1937 | Belgium | 74/594.2 |
| 430027 | 10/1938 | Belgium | 74/594.2 |
| 266637 | 7/1912 | Fed. Rep. of Germany | 74/594.2 |
| 977791 | 11/1950 | France | 74/594.2 |
| 594176 | 5/1959 | Italy | 74/594.1 |
| 17923 | 9/1898 | Switzerland | 74/594.2 |
| 4599 | of 1899 | United Kingdom | 74/594.1 |
| 173085 | 12/1921 | United Kingdom | 74/594.2 |
| 681509 | 10/1952 | United Kingdom | 74/594.2 |

Primary Examiner—Samuel Scott
Assistant Examiner—William R. Henderson
Attorney, Agent, or Firm—Stevens, Davis, Miller & Mosher

[57] ABSTRACT

A gear crank for a bicycle unidirectionally freely rotatably supporting at least one sprocket wheel with a crank body integrated with a crank shaft and a pair of crank arms at both ends of the shaft and having an inner ring which is passed over one of the arms to be mounted to one end of the shaft, is fixed with a cone, and supports, through a unidirectional rotational transmission, a driven member with the sprocket wheel in a unidirectionally freely rotating relation therewith.

1 Claim, 7 Drawing Figures

GEAR CRANK FOR A BICYCLE

This invention relates to a gear crank for a bicycle and more particularly to a gear crank for a bicycle comprising a one piece crank integrated with a shaft and a pair of crank arms attached to the shaft at both ends thereof, and a sprocket wheel (called hereinafter a gear).

Generally, this kind of gear crank is so constructed that the gear is fixed to one of the crank arms to be rotatable together with the shaft in both forward and reverse directions. In a bicycle employing such a gear crank, the driving chain, stretched around the gear, and a freewheel at a rear hub, stops its travel upon halting the crank rotation. Hence, when a multiple freewheel is, for example, used for speed change by shifting the chain through a derailleur, the chain travel stops after half of a revolution of the crank, so that speed change by the derailleur cannot be attained.

For solving the aforesaid problem, U.S. Pat. No. 3,492,883 has hitherto suggested a gear crank constructed such that between the gear and one of the crank arms is inserted a unidirectional rotational transmission which serves to transmit crank rotation to the gear when normally rotated i.e., in forward movement of the bicycle. The crank when rotating in reverse rotation does not cause rotation of the gear. The forward rotation of the bicycle wheel, even if the crank only rotates one half revolution, causes the chain to travel to resulting in normal rotation of the gear whereby the bicycle's speed change can be carried out.

The gear crank is, however, structurally inapplicable to the so-called one piece crank integrated with a crank shaft and a pair of crank arms because the shaft and each of the arms are separate and one of the arms is attached to an inner ring of a well known freewheel.

The gear crank of the invention employs a one piece crank combined with a gear in a unidirectionally freely rotatable relation therewith.

A main object of the invention is to provide a gear crank having a small number of parts, and having the gear assembled in the relation of free rotation in one direction.

Another object of the invention is to provide a gear crank which is simple in construction and readily applicable to an existing one piece gear crank.

The gear crank of the invention is characterized in that: a crank body, integrated with a shaft and a pair of crank arms at both ends of the shaft, is provided at both axial ends of the shaft with screw threads; cones are screwed onto each of the threaded ends of the shaft; an inner ring is mounted on an axial end of one of the cones; a cylindrical driven member, carrying therewith at least one of the gears, is rotatably supported to the inner ring through a pair of bearings; and a unidirectional rotational transmission is insertably mounted between the driven member and the inner ring.

Namely, the invention has been designed to mount the gear to the so-called one piece crank body in the relation of unidirectional free rotation. The gear crank of the invention is characterized in that the inner ring, supporting the driven member carrying the gear, passes over one arm to be mounted onto one of the threads on the shaft to be fixed to the shaft by means of a cone, and supports the driven member through the unidirectional rotational transmission so that the gear may be mounted to the shaft, in a freely rotatable relation with respect thereto. The inner ring may be fixed to the shaft in such a way that: first, the inner ring is integrated with the cone and supports the driven member; second, the inner ring is separated from the cone and the shaft is formed of a spline so that that the inner ring is coupled with the spline and positioned by the threaded cone being screwed onto one end of the shaft; and third, the inner ring is integrated with a bearing for the driven member and between the bearing and the one of the arms are provided a pin and a recess engageable with each other so that the inner ring may be fixed by the engagement of the pin with the recess.

Figure 2:
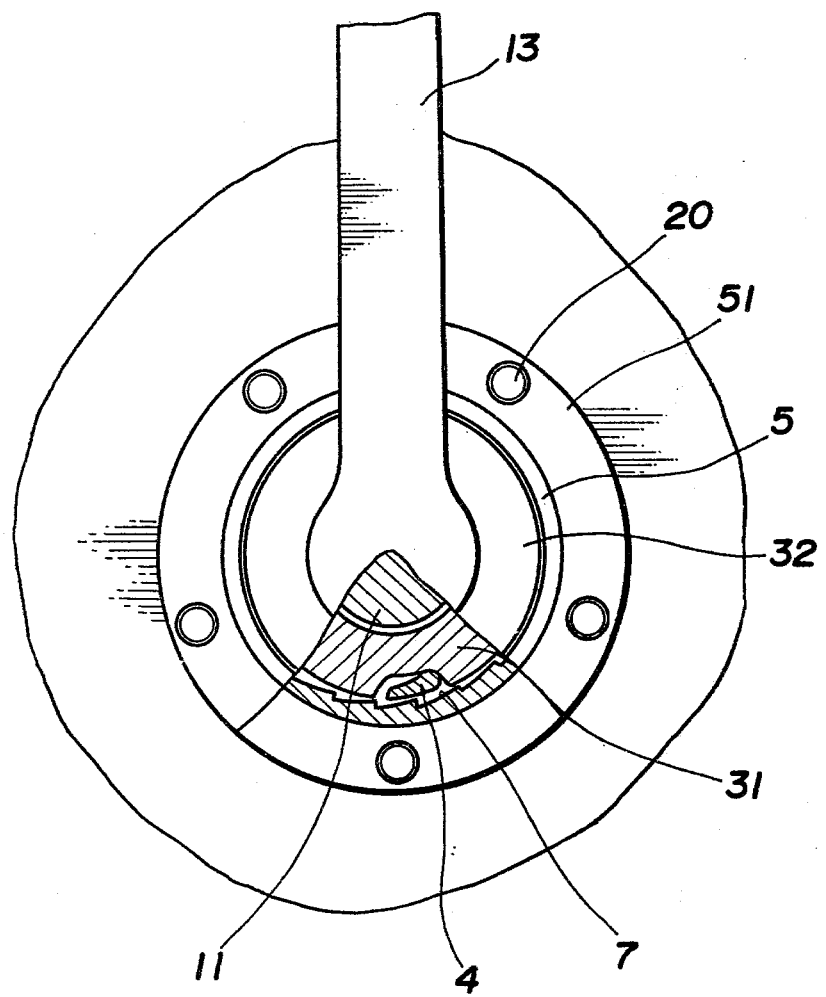
Figure 3:
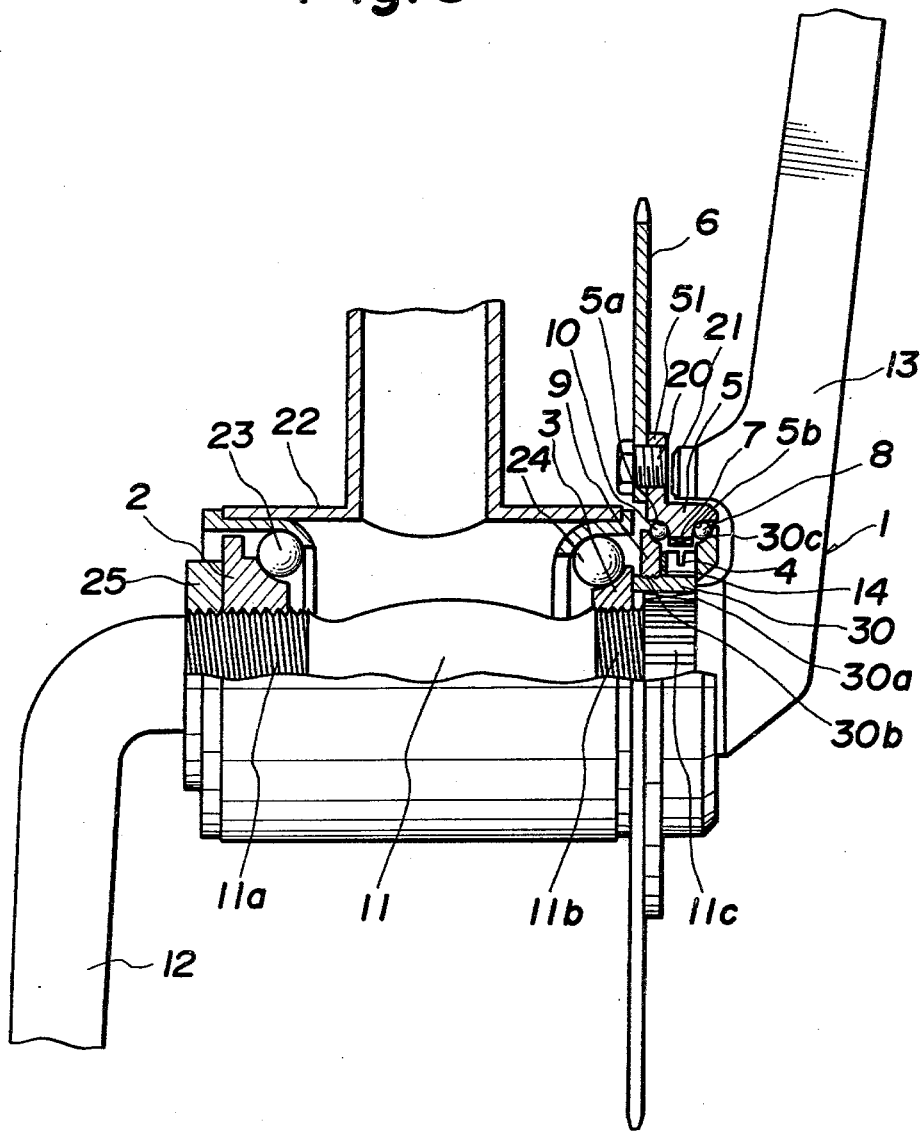
Figure 4:
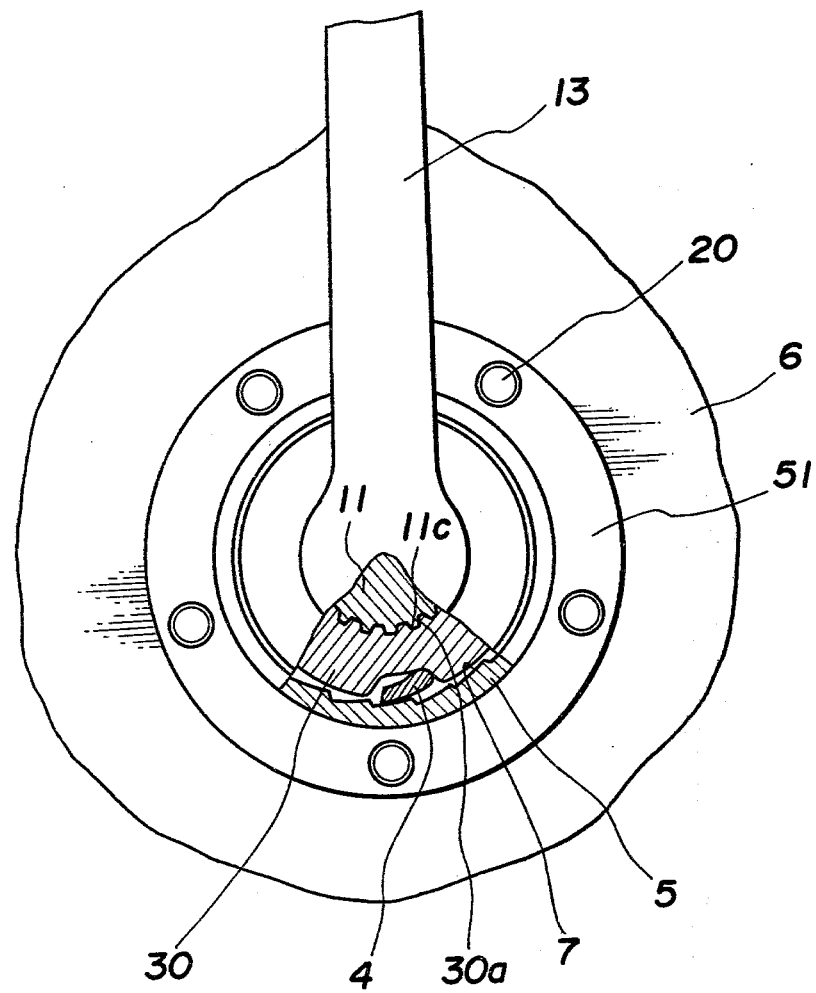
Figure 5:
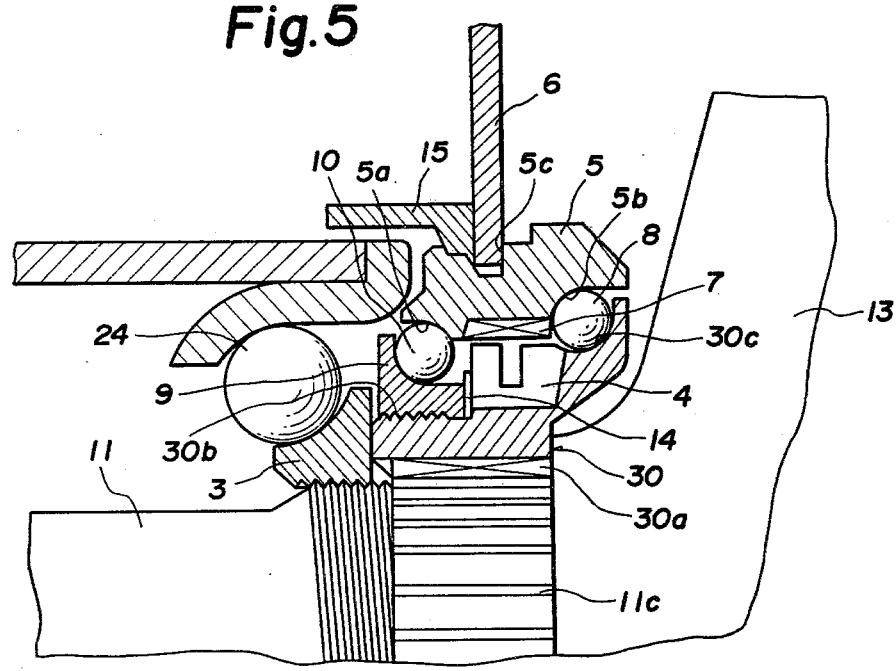
Figure 6:
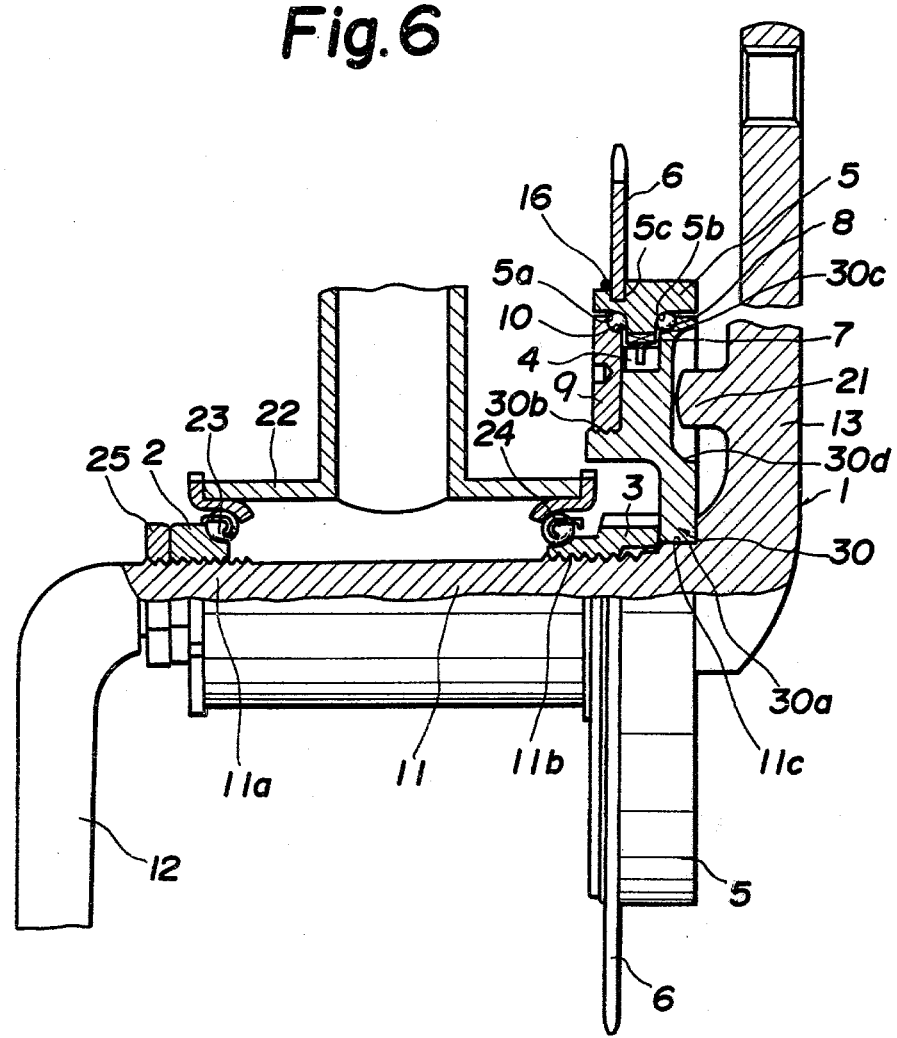
Figure 7:
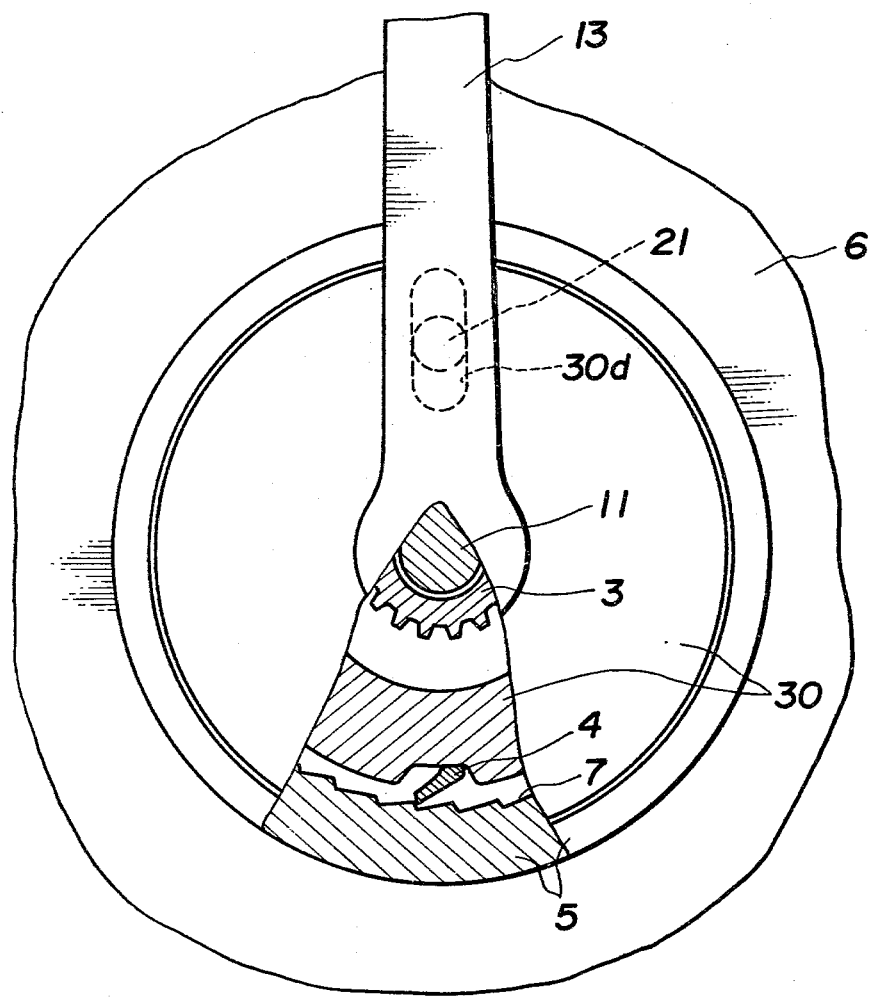

The aforesaid objects and features of the invention and others will be apparent from the following description of the embodiments in accordance with the accompanying drawings, in which FIG. 1 is a partially cutaway rear view of the gear crank of the invention, in a state of being attached to a bottom bracket of the bicycle, FIG. 2 is a partially cutaway side view of the gear crank of FIG. 1, FIG. 3 is a partially cutaway rear view of a modified embodiment, showing the gear crank attached to the bracket similar to FIG. 1, FIG. 4 is a partially cutaway side view of the gear crank of FIG. 3, FIG. 5 is a partially enlarged section of the principal portion of the gear crank of FIG. 3, FIG. 6 is a partially cutaway rear view of a further embodiment showing the gear crank attached to the bottom bracket of the bicycle, and FIG. 7 is a partially cutaway side view of the gear crank of FIG. 6.

The first embodiment shown in FIGS. 1 and 2 will now be described.

In the drawings, the numeral reference 1 generally designates a crank body comprising a crank shaft 11 and a pair of crank arms 12 and 13 at the axial ends of the shaft. The crank body is mainly cast in one piece.

At the outer peripheries of both axial ends of the shaft 11 are provided screw threads 11a and 11b. The threads 11a, nearest crank arm 12, have screwed thereon a cone 2 and a lock nut 25. The threads 11b, nearest the other arm 13, have screwed thereon a cone 3 which is integral with an inner ring to be hereinafter described.

The cone 3 is formed in a stepped cylindrical shape with a small diameter portion 31 having at its outer periphery a ball race 31a formed at one end thereof, a screw thread 31b at substantially the middle portion, and pawls 4 at the other end. A boundary of a large diameter portion 32 of the cone is provided at its outer periphery with a ball race 32a to receive balls 8 for carrying thereon a driven member to be hereinafter described.

A cylindrical driven member 5 is sleeved onto the cone 3. The driven member 5 is provided at its outer periphery with a gear 6, at substantially the intermediate portion of its inner periphery with ratchet teeth 7 in mesh with the pawls 4, and at both sides of the ratchet teeth 7 with ball races 5a and 5b. Between the ball race 32a and the ball race 5b are inserted the balls 8; and, between a ball holder 9 screwed onto the portion 31 by means of threads 31b and the ball race 5a of the driven member 5, are inserted balls 10, so that the driven member 5 may be rotatably supported on the cone 3 through the balls 8 and 10 and also can be driven unidirectionally by the crank shaft 11 i.e., during the bicycle wheel's forward rotation, by means of a unidirectional rotation transmission composed of the pawls 4 and ratchet teeth 7.

The gear crank, as shown in FIG. 1, is rotatably supported to a bottom bracket 22 of the bicycle frame in such a manner that between ball races of the bracket 22 and the cones 2 and 3 at both ends of the shaft 11 are inserted balls 23 and 24.

Now, the function of the aforesaid gear crank of the invention will be detailed.

First, when the shaft 11 is normally rotated by pedalling the crank arms 12 and 13, the driven member 5 and the gear 6 are rotatable integrally with the shaft 11 through the cone 3, pawls 4 and ratchet teeth 7 so as to drive the bicycle's rear wheel by means of the driving chain. However, when the shaft 11 is rotated in a reverse direction only the crank shaft 11 rotates, i.e., the driven member 5 is not rotated by the shaft 11.

Second, when the crank shaft 11 stops its rotation upon cessation of rotation of the arms, if the driving chain is travelling by rotation of the rear gear through the rear hub due to the wheel's rotation, the driven member 5 is rotated through the gear 6 in mesh with the chain and the cone 3 is not rotated. Hence, the driven member 5 and the gear 6 although rotating are not rotating because the shaft 11 is driving gear 6 through the ratchet teeth and pawls 4. Thus, the gear 6 is rotatable in the absence of the operation of the crank arms 12 and 13 so that the desired speed change by the derailleur can be effected.

Third, when the shaft 11 is rotated in a reverse direction by pedalling in that direction, only the shaft 11 rotates and the gear 6 does not rotate. As a result, a coaster brake hub can be used for the braking action. The hub is used as the rear hub carrying therewith a multi-speed freewheel. Namely, one of the arms 12 and 13, or the shaft 11, is provided with a wire or rod, which is pull-operable when reversely rotated, so that a clutch cone of the coaster brake hub is operable through the wire or rod to effect the braking action.

The aforesaid gear crank is so structured that the so-called one piece crank is combined with the cone 3 and the gear 6. The cone 3 serves as the inner ring for supporting the gear 6 in a unidirectionally rotatable relation thereby reducing the number of parts, simplifying the construction, and being easily applicable to the existing one piece crank. Thus, this simple construction enables the chain to travel even upon one half revolution of the crank during the bicycle's running downhill or the like to effect the speed change.

Next, a second embodiment in FIGS. 3 to 5 will be detailed.

Through the inner ring and the cone 3 in the first embodiment are integrated, the second embodiment has an inner ring 30 separated from the cone and a male spline 11c formed on the outer periphery of the end of shaft 11 adjacent to the threads 11b so that the inner ring is coupled with the spline 11c and fixed by the cone 3 screwed onto the thread 11b.

The inner ring 30 is formed in a cylindrical shape axially longer than the width of spline 11c and has on its outer periphery screw threads 30b formed at one end thereof, a ball race 30c at the other end, and a plurality of pawls 4 at substantially the intermediate portion. Ball holder 9 is screwed onto the threads 30b close to the pawls 4 through a spacer 14.

Other than the aforesaid, the gear crank is structurally similar to the first embodiment, that is, the driven member 5 with the gear 6 is rotatably supported on the inner ring 30 at the outer periphery thereof through balls 8 and 10 and has the unidirectional rotational transmission of the ratchet teeth 7 and the pawls 4. Also, the gear crank similarly functions in such a manner that when rotated in one direction i.e., the bicycle wheel's rotation in a forward direction, the shaft 11 conveys its rotation to the driven member 5 to allow the gear 6 and the shaft 11 to together rotate, while, when rotating in a reverse direction or not rotating, the driven member 5 is freely rotatable.

The crank body 1 is assembled in such a manner that: the inner ring 30 is sleeved thereon with the driven member 5 securing the gear 6 thereto and screwed with the ball holder 9, the gear 6 being kept in normal rotatable condition, and then passed over the tip of the crank arm 12 and the threads 11a and 11b to be coupled with the spline 11c through the female spline of the inner ring; the cone 3 is inserted over the tip of arm 12 in the same order to be screwed onto the threads 11b so as to secure the splined inner ring 30 to the shaft 11; and then the cone 2 and a lock nut 25 are similarly inserted through the arm 12 onto the shaft 11 so as to be screwed with the threads 11a.

As seen from the order of assembly, the minor diameter of cone 3 is larger than the major diameter of the threads 11a so that the cone 3 may be passed over the threads without interference. In similar fashion, the minor diameter of inner ring 30, is larger than the major diameter of the threads 11b so that the inner ring 30 easily passes over the threads 11a and 11b.

The second embodiment constructed as aforesaid makes it possible, while using the so-called one piece crank, to exactly secure the inner ring by means of a simple structure such that the inner ring is coupled with the shaft through the spline coupling and fixed by the cone screwed thereto. Furthermore any existing single crank can be easily adapted to this construction.

Accordingly, the simple construction of the second embodiment permits the chain to travel without crank rotation, thereby permitting the effecting of the speed change even if the crank is not rotating.

A third embodiment of the invention shown in FIGS. 6 and 7 will now be described.

This embodiment, like the second one, is constructed in such a manner that the inner ring 30 is formed separately from the cone 3; the shaft 11 is formed with an insertable engagement 11c, such as a spline coupling with the inner ring 30; the inner ring 30 is fixed by the cone 3 screwed onto the thread 11b on the shaft 11; an engageable recess 30d is formed on the outer axial side of the inner ring 30, and at the inner ring 30 side of the arm 13 is formed a pin 21 projecting toward the axial outer surface of the inner ring so that the pin 21 may be fixedly engaged with the recess 30d.

In greater detail, the inner ring 30, as shown in FIG. 6 is perforated at its center portion with a hole 30a engageable with the engagement 11c and provided on a stepped outer periphery with screw threads 30b. A plurality of pawls 4 and a ball holder with a screw thread 30b, a plurality of pawls 4 and a ball holder 30c, are formed sequentially outwardly from the inner ring end of the periphery. Also, at the outer axial surface of the inner ring 30 is formed the recess 30d extending radially thereof.

Thus, the inner ring 30, which is engaged with the engagement 11c of the shaft 11, is sandwiched at its inner annular portion between an end face of the arm 13 and the cone 3 screwed onto the threads 11b so as to be prevented from being axially moved; and is held against relative movement in the direction of rotation by means of the engagement of the recess 30d with the pin 21. For this purpose, the cone 3, as shown in FIG. 6, is axially outwardly extended at its one end so that the extension may abut the inner ring 30 at the central annular lateral side thereof and the recess 30d has a width which corresponds to the diameter of the pin 21. Where the crank body 1 of the existing gear crank has a pin for fixing a front gear therewith, that pin may be substituted for the pin 21, or a particularly designed pin may be used.

In addition, the inner ring 30 has the threads 30b onto which is screwed a ball holder 9 having a ball race and rotatably supports the cylindrical driven member 5 at the outer periphery of the ring.

The aforesaid members are assembled with the crank body 1 in such a manner that, like the second embodiment, the inner ring 30 is sleeved with the driven member 5 having the gear 6 fixed thereto, screwed with the ball holder 9, and the gear 6 is adjusted to be kept in a regular rotary condition; the inner ring 30 with the gear 6 is inserted over the tip of one arm 12 to be insertably engaged with the engagement 11c after passing over the threads 11a and 11b; the cone 3 is, in the same order, inserted to be screwed onto the threads 11b so as to fix the formerly inserted inner ring 30 by means of the cone 3 screwed to the shaft 11. Then, the cone 2 and lock nut 25 are similarly inserted onto the shaft 11 over the arm 12 to be screwed onto the threads 11a.

As best seen from the order of assembly, it is necessary that the minor diameter of the cone 3 is larger than the major diameter of the threads 11a so that the cone 3 may pass over the threads 11a without any interference. Also, the diameter of the engagement 11c of the shaft 11 is larger than the major diameter of the threads 11b thereof so that the inner ring 30 may be inserted without interference of the engagement 11c with the threads 11a and 11b.

Thus, the gear crank of the third embodiment can rigidly fix the inner ring 30 by being insertably coupled with the shaft 11 and engaged with the pin 21.

In addition, the gear 6, in this construction may, be fixed to the driven member 5 in such a manner that: the driven member 5, as shown in FIGS. 1 and 3, is provided with a flange 51 with which the gear is fixed through a bolt 20 or a rivet; the gear 6 is integral with the driven member 5 (not shown); or the driven member 5, as shown in FIGS. 5 and 6, is provided at the outer periphery thereof with an annular groove 5c with which the gear 6 is fixed by means of an annular holder 15 serving as a cover as shown in FIG. 5 or a snap ring 16 as in FIG. 6. Although only one gear 6 is shown in each embodiment, a plurality of such gears may be provided.

While various embodiments of the invention have been shown and described, the invention is not limited to the specific construction thereof, which is merely exemplified in the specification rather than defined.

What is claimed is:

1. A gear crank for a bicycle, said gear crank comprising:
   an integral crank body comprising:
      a crank shaft, and
      a crank arm connected to each end of said crank shaft, one of said crank arms being of an external size smaller in diameter than said crank shaft, the other of said crank arms being of an external size in diameter greater than said crank shaft and having at the connecting portion to said crank shaft an inner end face extending radially outwardly of said shaft,
   said crank shaft being externally threaded at each end thereof;
   said threads on the end of the crank shaft adjacent the crank arm having a diameter greater than said crank shaft being larger than the threads on the other end of said crank shaft;
   internally threaded cones for bearing balls, said cones being screwed onto said externally threaded ends of said crank shaft;
   an inner ring integrally formed as an axial extension of one of said cones and fixed to one axial end of said crank shaft, said inner ring being passable over said one crank arm of external diameter smaller than said crank shaft, so that said one cone screwed to said shaft urges said inner ring at one axial end of said shaft to be fixed to the inner end face of said crank arm of external diameter greater than said crank shaft;
   a pair of bearings each including a pair of ball races confining balls therebetween, one of said bearings having an associated bearing race formed integrally with said inner ring;
   a cylindrical driven member;
   at least one sprocket wheel secured to said cylindrical driven member;
   said inner ring supporting, at the outer periphery thereof, said cylindrical driven member through said pair of bearings in freely rotatably relation; and
   a unidirectional rotation transmission, between said inner ring and said cylindrical driven member, for transmitting rotation of said crank shaft to said cylindrical member in only one direction of rotation.

* * * * *